United States Patent Office 2,826,580
Patented Mar. 11, 1958

2,826,580
DERIVATIVES OF 7,9-PYRIMIDINO PYRIMIDINE-(1,3) AND A PROCESS OF MAKING SAME

Gottwalt Franz Fischer, Wurzburg, and Josef Roch and August Kottler, Biberach (Riss), Germany, assignors to Dr. Karl Thomae G. m. b. H., Biberach (Riss), Germany, a corporation of Germany No Drawing. Application January 14, 1955
Serial No. 481,975

Claims priority, application Germany January 15, 1944

12 Claims. (Cl. 260—256.4)

The present invention relates to derivatives of 7,9-pyrimidino pyrimidine-(1,3) and more particularly to 7,9-pyrimidino pyrimidine-(1,3) compounds having at least one oxo group in their molecule, and to a process of making same.

It is one object of the present invention to provide new and valuable compounds derived from a new bicyclic heterocyclic ring system, the 7,9-pyrimidino pyrimidine-(1,3) ring system. Said novel ring system is similar to but differs from the known purine ring system by the introduction of a further carbon atom into its five-membered nucleus. The new derivatives of said ring system as they are obtained according to the present invention are designated hereinafter and in the claims annexed hereto as "homopurine" compounds. The "homopurine," i. e. 7,9-pyrimidino pyrimidine-(1,3) ring system, corresponds to the following formula:

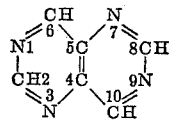

I

Another object of the present invention is to provide a simple and effective process of producing said new and valuable 7,9-pyrimidino pyrimidine-(1,3) or "homopurine" compounds.

Other objects of the present invention and advantageous features thereof will become apparent as the description proceeds.

In principle, the process of producing such new and valuable homopurine compounds comprises condensing pyrimidine carboxylic acids-(4) which are substituted in 5-position and which may contain other substituents in the pyrimidine ring, or their reactive functional derivatives, preferably in the presence of ammonia or of compounds yielding ammonia or in the presence of primary amines, with compounds of the following formula:

II wherein R is hydrogen, an alkyl, aryl, aralkyl, or heterocyclic group, or a substituted or unsubstituted hydroxyl, mercapto, or amino group while X is oxygen, sulfur, or an imino group which may be substituted by an alkyl, aryl, aralkyl, heterocyclic, or acyl group, and Y is an amino group which may also be substituted by an alkyl, aryl, aralkyl, heterocyclic, or acyl group and wherein X and Y together may be a nitrogen atom forming a nitrile group with the carbon atom to which said nitrogen atom is attached.

Suitable reactants of Formula II are, for instance, compounds of the following formulas:

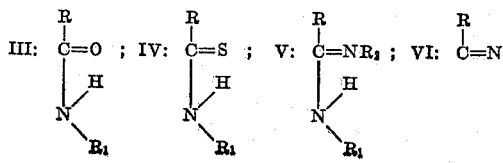

In said Formulas III to VI R indicates hydrogen, an alkyl, aryl, aralkyl, or heterocyclic group, or a substituted or non-substituted hydroxyl, mercapto, or amino group, while $R_1$ and $R_2$ are hydrogen, alkyl, aryl, aralkyl, heterocyclic, or acyl groups.

Compounds of Formula III which can be reacted with the pyrimidine carboxylic acids-(4) are, among others, acid amides, urea, or urethane compounds; compounds of Formula IV are thiourea compounds. Compounds of Formula V are, for instance, amidines and guanidines while compounds of Formula VI are, for instance, acid nitriles, cyanate or isocyanate compounds, cyanamide or thiocyanate compounds.

The other reactant used as starting material in this reaction, the pyrimidine carboxylic acid-(4), carries in 5-position a reactive substituent, such as halogen, the hydroxyl group or a substituted hydroxyl group, the mercapto group or a substituted mercapto group, and the amino group or a substituted amino group.

In place of the free pyrimidine carboxylic acid-(4) there can be used their reactive functional derivatives, such as their esters, halogenides, amides, or nitriles.

Said pyrimidine carboxylic acids-(4) or their reactive derivatives can contain further substituents in the pyrimidine ring, such as halogen, alkyl, aryl, aralkyl, or heterocyclic groups, substituted hydroxyl groups, sulfhydryl or amino groups which might also be substituted, or one unsubstituted hydroxyl group.

To illustrate the new reaction according to the present invention, equations of the following examples of such reactions are given without, however, being limited to said equations:

(a) 2-methyl-5-amino pyrimidine carboxylic acid-(4) is condensed with urea to form 2-methyl-8,10-dioxo homopurine whereby water and ammonia are split off. The following equation illustrates this reaction.

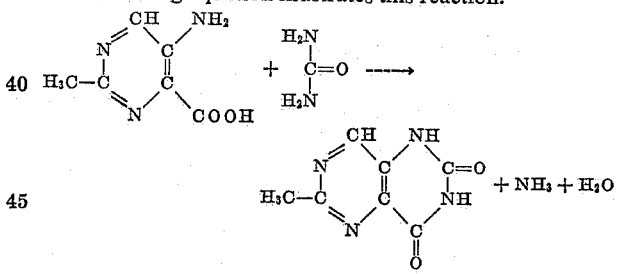

(b) 2-methyl-5-amino pyrimidine carboxylic acid-(4) reacts with diphenyl formamidine to form 2-methyl-9-phenyl-10-oxo homopurine according to the following equation:

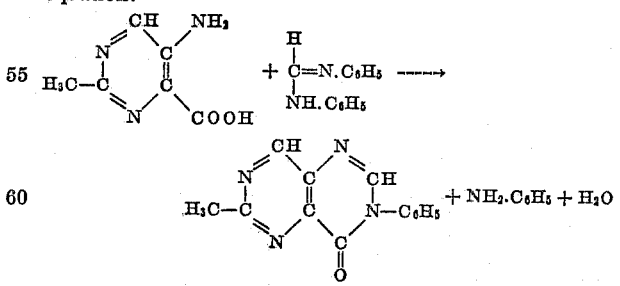

It is understood, of course, that when using dialkyl or diaryl substituted amidines and urea derivatives, only one single alkyl or aryl group remains in the molecule while the second alkyl or aryl group is split off in the form of an alkyl amine or aryl amine. Thus, for instance, 2-methyl-9-phenyl-10-oxo homopurine is formed on condensing 2-methyl-5-amino pyrimidine carboxylic acid-(4) with N,N'-diphenyl formamidine as well as with N-monophenyl formamidine.

Furthermore, it has been found that there can be used as starting materials, in place of the compounds of the above given Formulas III, IV, and V, reaction components of simpler constitution which are capable of forming compounds of said Formulas III, IV, and V in the course of the reaction and under the reaction conditions.

Compounds which are capable of forming compounds of the Formulas III and IV in the course of the reaction under the reaction conditions are, for instance, the following compounds: ammonium formiate, used in place of formamide; formic acid and aniline, used in place of formanilide; phosgene and amines, used in place of urea compounds; isocyanates and water, used in place of urea compounds.

Starting materials of simpler constitution which are capable of forming compounds of the Formula V are, for instance, the following compounds: (a) Ortho-formic acid esters and aniline or formic acid and aniline, used in place of N,N'-diphenyl formamidine; (b) benzimino ethers and ammonia, used in place of benzamidine.

The reaction according to the present invention is preferably carried out at elevated temperature, and more advantageously at a temperature between about 50° C. and about 250° C. It is possible to proceed in the presence or the absence of solvents or diluting agents, respectively. Solvents or diluting agents which can be used for carrying out the process according to this invention, are, for instance, water, mono- and polyvalent alcohols, amides, aliphatic or aromatic tertiary amines, and others.

In a number of cases, especially when using 5-halogen substituted pyrimidine carboxylic acids-(4) as starting material it is of advantage to proceed in the presence of reaction accelerators. Such reaction accelerators are, for instance, copper sulfate or copper metal powder. In some specific cases the use of agents capable of splitting off water has proved to be of particular advantage. Such agents for splitting off water are, for instance, acetic acid anhydride, hydrochloric acid, alkali hydroxides. It is, of course, also possible to carry out the reaction under pressure.

Furthermore it has been found that the reaction of suitably substituted 5-amino pyrimidine carboxylic acids-(4) with cyanates proceeds under especially mild reaction conditions. Such a reaction proceeds, for instance, rapidly and completely in aqueous solution and while heating. Thereby there are formed, as intermediate reaction products, 5-ureido pyrimidine carboxylic acid-(4) which can directly be converted into the corresponding homopurine compounds or after they have been isolated from the reaction mixture.

The reaction of 2-methyl-5-amino pyrimidine carboxylic acid-(4) with cyanic acid or cyanates to form 2-methyl-8,10-dioxo homopurine proceeds via 2-methyl-5-ureido pyrimidine carboxylic acid-(4) obtained thereby as intermediate product as is illustrated by the following equation:

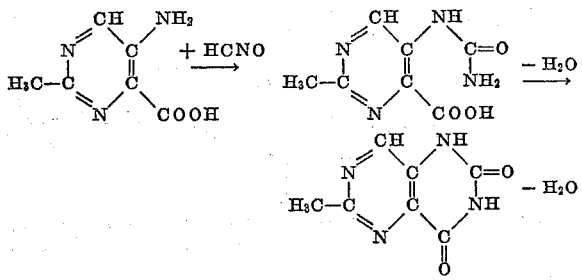

The homopurines made available by the process according to the present invention are, in many respects, analogous to the known purines. They can partly or completely be substituted at their nitrogen atoms in an analogous manner as said known purine compounds and according to conventional methods and can, for instance, be alkylated, arylated, or aralkylated.

The reaction products are of importance as therapeutically effective compounds or as starting materials for producing such compounds.

The following examples serve to illustrate the invention without, however, limiting the same thereto.

EXAMPLE 1

2-methyl-8,10-dioxo homopurine prepared from 2-methyl-5-amino pyrimidine carboxylic acid-(4) and urea.

9.2 g. (0.06 mol) of 2-methyl-5-amino pyrimidine carboxylic acid-(4) are added, within about 5 minutes, to 36 g. (0.6 mol) of molten urea heated to 150–160° C. Presently granular crystals start to precipitate from the initially clear dark reaction solution. The reaction mixture is kept at a temperature of 150–160° C. for about 45 minutes. 50 cc. of water are added thereto and the precipitated crystals are filtered off by suction while the mixture is still warm. The filtered crystals are washed with water and acetone and are dried at 110° C. Yield: 6.8 g. of brown 2-methyl-8,10-dioxo homopurine, corresponding to 63.5% of the theoretical yield. Said crude crystals are dissolved in a small amount of highly diluted ammonia, treated with animal charcoal, and precipitated with glacial acetic acid. This procedure is repeated three times. Thereby colorless needles of silky luster are obtained which often form star-shaped aggregates. Said crystals do not melt even when heated to a temperature up to 340° C. For analytical purposes they are dried at 130° C. and a vacuum of 0.04 Torr. Mol weight: 178.2.

Calculated for $C_7H_6O_2N_4$: 47.19% C; 3.39% H; 31.44% N. Found: 47.26% C; 3.35% H; 30.67% N.

EXAMPLE 2

2-methyl-8,10-dioxo homopurine prepared from 2-methyl-5-bromo pyrimidine carboxylic acid-(4) and urea in concentrated ammonia with the addition of copper sulfate as catalyst.

11 g. (0.05 mol) of 2-methyl-5-bromo pyrimidine carboxylic acid-(4) and 30 g. (0.5 mol) of urea are heated with 65 cc. of aqueous 25% ammonia and 2.5 cc. of copper sulfate solution, saturated in the cold, in a heavy-walled sealed glass tube in a boiling water bath for 2 hours. The reaction mixture is then transferred to a wide-neck round-bottom glass flask. First the water is removed by evaporation in an oil bath and then the temperature in said glass flask is kept at about 170° C. for 30 minutes. After digesting the reaction mass with 150 cc. of water, the crude homopurine derivative is filtered off by suction while still warm. 5.5 g., corresponding to 61% of the theoretical yield, are obtained. On recrystallization from water, the yield of pure 2-methyl-8,10-dioxo homopurine is 3.7 g. corresponding to 41.5% of the theoretical yield.

EXAMPLE 3

2-methyl-8,10-dioxo homopurine prepared from 2-methyl-5-bromo pyrimidine carboxylic acid-(4) and urea in methanol with the addition of copper sulfate and sodium hydroxide.

2.2 g. (0.01 mol) of 2-methyl-5-bromo pyrimidine carboxylic acid-(4) are heated with 6.0 g. (0.1 mol) of urea, 0.8 g. of sodium hydroxide, and 0.25 g. of crystalline copper sulfate containing water of crystallization in 10 cc. of methanol from a temperature of 65° C. to a temperature of about 100° C. within about 1 hour. At the end of the reaction the solution acquires a brown color and an amorphous precipitate separates. The reaction mixture is taken up in 20 cc. of water. The aqueous solution is acidified with glacial acetic acid and yields 2-methyl-8,10-dioxo homopurine.

EXAMPLE 4

2-phenyl-8,10-dioxo homopurine prepared from 2-phenyl-5-amino pyrimidine carboxylic acid-(4) and urea.

2.5 g. (0.012 mol) of 2-phenyl-5-amino pyrimidine carboxylic acid-(4) are heated with 9.0 g. (0.15 mol) of urea to about 160° C. for 30 minutes. First solution takes place and thereafter precipitation of lustrous crystals. The resulting viscous paste is digested with 50 cc. of water and the precipitated crystals are filtrated off by suction, washed, and dried. The crystals are dissolved in 900 cc. of a hot 2% triethanol amine solution and are treated with animal charcoal. On cooling, the amide of 2-phenyl-5-amino pyrimidine carboxylic acid-(4) crystallizes. It is filtered off by suction. Glacial acetic acid is added to the mother liquor, while heating. Thereby 2-phenyl-8,10-dioxo homopurine precipitates and is filtered off by suction while still warm. 0.9 g. of colorless, microcrystalline granules corresponding to a yield of 31.2% of the theoretical yield are obtained thereby. Said compound does not melt even on heating to 360° C. For analytical purposes the crystals are dried at 130° C. and in a vacuum of 0.1 Torr. Mol weight: 240.2.

Calculated for $C_{12}H_8O_2N_4$: 59.99% C; 3.36% H; 23.33% N. Found: 59.73% C; 3.61% H; 23.94% N.

EXAMPLE 5

2-benzyl-8,10-dioxo homopurine prepared from 2-benzyl-5-amino pyrimidine carboxylic acid-(4) and urea.

2-benzyl-5-amino pyrimidine carboxylic acid-(4) is produced in an analogous manner as described by Z. Budesinsky "Collect. czechoslov. chem. Commun.," vol. 14, page 223 (1949) for the preparation of 2-methyl-5-amino pyrimidine carboxylic acid-(4). Thereby the corresponding 2-benzyl-5-bromo pyrimidine carboxylic acid-(4) is obtained as intermediate product.

3.0 g. (0.013 mol) of said 2-benzyl-5-amino pyrimidine carboxylic acid-(4), melting at 188–190° C., are heated with 9 g. (0.15 mol) of urea to about 170° C. for 30 minutes. Thereby a clear, brown, molten reaction mixture is obtained which, on addition of 20 cc. of water, first yields a dark, viscous oil. Said oil, on standing for about 20 hours, solidifies in crystalline form. 2.6 g. of said crude crystals are obtained. The crystals are digested with acetone. A considerable amount thereof passes into solution. The residue is filtered off by suction and the thus obtained homopurine compound is finally purified by reprecipitation which is repeated three times. The resulting very small, irregular, elongated, colorless leaflets which start to decompose at about 300° C. are dried for analytical purposes at 130° C. and in a vacuum of 0.1 Torr. Mol weight: 254.2.

Calculated for $C_{13}H_{10}O_2N_4$: 61.41% C; 3.97% H; 22.04% N. Found: 61.07% C; 4.39% H; 21.91% N.

EXAMPLE 6

2-methyl-9-phenyl-10-oxo homopurine prepared from 2-methyl-5-amino pyrimidine carboxylic acid-(4) and N,N'-diphenyl formamidine.

3.0 g. (0.02 mol) of 2-methyl-5-amino pyrimidine carboxylic acid-(4) are heated with 7.8 g. (0.04 mol) of N,N'-diphenyl formamidine to 170° C. for 30 minutes. The resulting brown, clear, molten reaction mixture is cooled to about 80° C. 10 cc. of acetone are then added thereto. The mixture is allowed to stand for about 2 hours, whereby crystals precipitate. 10 cc. of ether are added thereto and the crystals are filtered off by suction, washed with ether, and dried. Yield: 2.3 g. corresponding to 48% of the theoretical yield. For analytical purposes the crude 2-methyl-9-phenyl-10-oxo homopurine is subjected to sublimation at a bath temperature between 160° C. and 170° C. and at a vacuum of 0.08 Torr. Sublimation is repeated three times whereby microscopic fine, lustrous fibers are obtained. Mol weight: 238.2.

Calculated for $C_{13}H_{10}ON_4$: 65.53% C; 4.23% H; 23.52% N. Found: 65.31% C; 4.36% H; 24.06% N.

EXAMPLE 7

2-phenyl-9-methyl-10-oxo homopurine prepared from 2-phenyl-5-amino pyrimidine carboxylic acid-(4) and N,N'-dimethyl formamidine.

3.0 g. (0.014 mol) of 2-phenyl-5-amino pyrimidine carboxylic acid-(4) are heated with about 0.1 mol of N,N'-dimethyl formamidine, obtained by passing dry methylamine into orthoformic acid esters, to about 120° C. within about 10 minutes. Thereby vigorous reaction sets in and the temperature within the reaction mixture decreases to 110° C. although the bath temperature is at 170–180° C. The reaction mixture is then heated to about 145° C. within about 20 minutes. The brown, crumbly, still somewhat moist reaction mixture is digested with 10 cc. to 20 cc. of acetone and the resulting crude, slightly grayish 2-phenyl-9-methyl-10-oxo homopurine is isolated by filtering off by suction. Yield: 2.4 g., corresponding to 72% of the theoretical yield. For analytical purposes said compound is twice recrystallized from methanol whereby colorless prisms and needles melting at 210–213° C. are obtained which are dried at 130° C. and at a vacuum of 0.1 Torr. Mol weight: 238.2.

Calculated for $C_{13}H_{10}ON_4$: 65.54% C; 4.23% H; 23.52% N. Found: 65.16% C; 4.46% H; 22.96% N.

EXAMPLE 8

2,7-dimethyl-8,10-dioxo homopurine prepared from 2-methyl-5-methylamino pyrimidine carboxylic acid-(4) and urea.

3.4 g. (0.02 mol) of 2-methyl-5-methylamino pyrimidine carboxylic acid-(4) are heated with 12 g. (0.2 mol) of urea to about 170° C. for 30 minutes. On cooling the resulting clear, brown molten reaction mixture, the crude homopurine compound precipitates in crystalline form. It is digested with methanol, filtered off by suction, and boiled twice with methanol (150 cc. and 50 cc. respectively). The resulting residue in the amount of 1.7 g. is combined with the compound which precipitates on cooling the methanolic mother liquors in the amount of 0.4 g. Altogether there are obtained 2.1 g. corresponding to 55% of the theoretical yield. Said compound is twice recrystallized from 200 cc. of water or of a mixture of equal parts of methanol and water, respectively. Thereby 2,7-dimethyl-8,10-dioxo homopurine is obtained in short microcrystalline prisms with slanted edges. Said compound melts, on rapidly heating, at 315–317° C. thereby partly decomposing. For analytical purposes, the compound is dried at 130° C and at a vacuum of 0.1 Torr. Mol weight: 192.2.

Calculated for $C_8H_8O_2N_4$: 50.00% C; 4.20% H; 29.15% N. Found: 50.11% C; 4.26% H; 28.12% N.

EXAMPLE 9

2-methyl-9-phenyl-10-oxo homopurine prepared from 2-methyl-5-amino pyrimidine carboxylic acid -(4), orthoformic acid ethyl ester, and aniline.

1.5 g. (0.01 mol) of 2-methyl-5-amino pyrimidine carboxylic acid-(4) are heated with 4.5 g. (0.03 mol) of orthoformic acid ethyl ester and 5.6 g. (0.06 mol) of aniline, first to about 100° C. for 30 minutes and thereafter to 170° C. within about 15 minutes. 10 cc. of a mixture of equal parts of acetone and ether are added to the resulting brown solution. The crude homopurine compound is precipitated. It is filtered off after standing for 2 hours, washed, and dried at 110° C. Yield: 1.5 g. corresponding to 63% of the theoretical yield. The compound is purified by sublimation in a vacuum and is identical with the compound obtained according to Example 6.

EXAMPLE 10

2-methyl8,10-dioxo homopurine prepared from 2-methyl-5-amino pyrimidine carboxylic acid-(4), sodium cyanate, and ammonium chloride.

A suspension of 1.5 g. (0.01 mol) of 2-methyl-5-amino-pyrimidine carboxylic acid-(4), 3.3 g. (0.05 mol) of sodium cyanate, and 2.7 g. (0.05 mol) of ammonium chloride in 5 cc. of water are heated to about 170° C. within 25 minutes and the mixture is then allowed to react at said temperature for 25 more minutes. The resulting almost dry residue is digested with 10 cc. of water, filtered off by suction, washed, and dried at 110° C. Yield of crude 2-methyl-8,10-dioxo homopurine: 1.1 g. corresponding to 62% of the theoretical yield.

EXAMPLE 11

2-methyl-8,10-dioxo homopurine prepared from 2-methyl-5-amino pyrimidine carboxylic acid-(4) and sodium cyanate in aqueous solution with the isolation of 2-methyl-5-ureido pyrimidine carboxylic acid-(4) as intermediate product.

(a) *2-methyl-5-ureido pyrimidine carboxylic acid-(4)*

4.5 g. (0.03 mol) of 2-methyl-5-amino pyrimidine carboxylic acid-(4) and 3.9 g. (0.06 mol) of sodium cyanate are dissolved in 60 cc. of water. The solution is acidified with concentrated hydrochloric acid and allowed to stand for some time. Thereby 2-methyl-5-ureido pyrimidine carboxylic acid-(4) precipitates in amorphous form. It is filtered off by suction, washed, and dried at 110° C. Yield: 4.5 g. corresponding to 76% of the theoretical yield.

(b) *2-methyl-8,10-dioxo homopurine*

(1) By heating with dilute sodium hydroxide solution: 1 g. (0.005 mol) of 2-methyl-5-ureido pyrimidine carboxylic acid-(4) is heated to boiling with 10 cc. of 2 N sodium hydroxide solution. On acidifying with glacial acetic acid, 2-methyl-8,10-dioxo homopurine precipitates in crystalline form. Yield: 0.6 g. corresponding to 67% of the theoretical yield.

(2) By heating with acetic acid anhydride: 1 g. of 2-methyl-5-ureido pyrimidine carboxylic acid-(4) are heated in 100 cc. of acetic acid anhydride on a boiling water bath for 2 hours. Acetic acid anhydride is removed by evaporation and the resulting crude 2-methyl-8,10-dioxo homopurine is digested with water, filtered off by suction, washed, and dried. Yield: 0.4 g. corresponding to 45% of the theoretical yield.

(3) By heating with hydrochloric acid: 1 g. of 2-methyl-5-ureido pyrimidine carboxylic acid-(4) are heated with 100 cc. of 20% hydrochloric acid on the water bath for 2 hours. Most of the hydrochloric acid is then removed by evaporation in a vacuum and the remainder is neutralized by the addition of dilute ammonia. Thereby 0.2 g. of the corresponding homopurine compound precipitate.

EXAMPLE 12

2-methyl-8,10-dioxo homopurine prepared from 2-methyl-5-amino pyrimidine carboxylic acid-(4) and sodium cyanate in aqueous solution without intermediate isolation of the corresponding ureido acid.

1.5 g. (0.01 mol) of 2-methyl-5-amino pyrimidine carboxylic acid-(4) and 2.6 g. (0.04 mol) of sodium cyanate are dissolved in 30 cc. of water. The solution is acidified with concentrated hydrochloric acid and is then allowed to stand for 30 minutes. 5 cc. of 8 N sodium hydroxide solution are then added thereto and the mixture is heated to boiling, acidified with glacial acetic acid, and allowed to stand for some time. 2-methyl-8,10-dioxo homopurine precipitates in crystalline form. Yield: 0.5 g. corresponding to 28% of the theoretical yield.

EXAMPLE 13

2,7,9-trimethyl - 8,10 - dioxo homopurine (8 - methyl homotheophylline) prepared from 2-methyl-8,10-dioxo homopurine.

(a) By means of diazomethane: 40 cc. (about 0.04 mol) of an ethereal diazomethane solution are poured over 1.8 g. (0.01 mol) of finely pulverized 2-methyl-8,10-dioxo homopurine and the mixture is allowed to stand for 6 hours while shaking occasionally. Thereafter 40 cc. of said ethereal diazomethane solution are added and the mixture is again allowed to stand for 14 hours. The reaction mixture is subsequently shaken for about 8 hours. About 1.5 g. remain undissolved, are filtered off by suction, and are twice extracted by boiling with 30 cc. of dry chloroform. The first chloroform extract is concentrated by evaporation to a volume of 1 cc. to 2 cc. After allowing said concentrated extract to stand for some time, 2,7,9-trimethyl-8,10-dioxo homopurine precipitates in the form of well-shaped, clear prisms most of which are pointed at their ends. For analytical purposes the compound is subjected to sublimation at a bath temperature of 140° C. in a vacuum of 0.04 Torr. Melting point of the pure compound: 192–194° C. Mol weight: 206.2.

Calculated for $C_9H_{10}O_2N_4$: 52.42% C; 4.89% H; 27.17% N. Found: 52.21% C; 4.87% H; 26.62% N.

(b) By means of dimethyl sulfate: 3.4 g. (0.03 mol) of dimethyl sulfate are added to a solution of 1.8 g. (0.01 mol) of 2-methyl-8,10-dioxo homopurine in 80 cc. of 0.25 N sodium hydroxide solution while stirring mechanically and keeping the temperature of reaction mixture at 30° C. Thereafter 2 N sodium hydroxide solution is added drop by drop to said mixture in such a manner that its pH is kept between 8.0 and 10.0. Duration: 30 minutes. 5 cc. of said 2 N sodium hydroxide solution are consumed. Stirring of the mixture is continued for 30 more minutes at a temperature of 30° C. and a pH-value between 8.0 and 10.0. The resulting clear solution is then acidified with dilute acetic acid and is evaporated to dryness in a vacuum. Absolute ethanol is added to the residual viscous sirup and the mixture is again evaporated to dryness. The resulting almost dry mixture is then extracted with chloroform, the chloroform is evaporated from the extract, and the crude trimethyl dioxo homopurine compound is obtained in the form of a light yellow amorphous product. Yield: 1.2 g. corresponding to 58% of the theoretical yield. The compound is purified by recrystallization from methanol.

EXAMPLE 14

2-methyl-8,10-dioxo homopurine prepared from 2-methyl-5-amino pyrimidine carboxylic acid-(4)-amide and urea.

0.8 g. (0.005 mol) of 2-methyl-5-amino pyrimidine carboxylic acid-(4)-amide (melting point: 209–211° C.), obtained by heating 2-methyl-5-bromo pyrimidine carboxylic acid-(4)-amide with aqueous concentrated ammonia in a sealed heavy-walled glass tube, are heated with 3.0 g. (0.05 mol) of urea to 170–180° C. for 30 minutes. 15 cc. of water are added to the molten reaction mixture and the 2-methyl-8,10-dioxo homopurine precipitated thereby is filtered off by suction and is recrystallized from water. Yield: 0.6 g. corresponding to 64% of the theoretical yield.

EXAMPLE 15

2-methyl-8,10-dioxo homopurine prepared from 2-methyl-5-amino pyrimidine carboxylic acid-(4) and cyanogen bromide.

0.4 g. (0.004 mol) of cyanogen bromide, dissolved in 15 cc. of warm water, are added to a solution of 1.5 g. (0.01 mol) of 2-methyl-5-amino pyrimidine carboxylic acid-(4) in 30 cc. of hot water. The mixture is allowed to stand for several days. The resulting dark brown reaction solution is evaporated to dryness. The almost black residue is heated with 10 cc. of 2 N sodium hydroxide solution on the water bath for 30 minutes and crude 2-methyl-8,10-dioxo homopurine is precipitated by acidifying with glacial acetic acid. Yield: 0.2 g. corresponding to 34% of the theoretical yield.

EXAMPLE 16

2-methyl thio-8,10-dioxo homopurine prepared from 2-methyl thio - 5 - amino pyrimidine carboxylic acid-(4) and urea.

3.7 g. (0.02 mol) of 2-methyl thio-5-amino pyrimidine carboxylic acid-(4) are heated with 12.0 g. (0.2 mol) of urea to about 180° C. for 30 minutes. The reaction mixture is somewhat cooled and digested with 100 cc. of methanol. The resulting crude 2-methyl thio-8,10-dioxo homopurine is filtered off by suction, washed with methanol, and dried at 110° C. Yield: 2.7 g. corresponding to 64% of the theoretical yield. For analytical purposes the compound is twice reprecipitated from dilute ammonia and the thus obtained faintly yellow needles, which do not melt even on heating to 350° C., are dried at 130° C. and under a vacuum of 0.1 Torr. Mol weight: 210.2.

Calculated for $C_7H_6O_2N_4S$: 40.00% C; 2.88% H. Found: 40.36% C; 3.07% H.

EXAMPLE 17

2-ethyl thio-8,10-dioxo homopurine prepared from 2-ethyl thio-5-amino pyrimidine carboxylic acid-(4) and urea.

4.0 g. (0.02 mol) of 2-ethyl thio-5-amino pyrimidine carboxylic acid-(4) of the melting point 137–139° C., which compound is obtained by heating 2-ethyl thio-5-bromo pyrimidine carboxylic acid-(4) with concentrated ammonia in a sealed, heavy-walled glass tube, are heated with 12 g. (0.2 mol) of urea to 180–190° C. for 30 minutes. The reaction mixture is cooled and digested with 30 cc. of water. The resulting crude homopurine compound is filtered off by suction, washed, and dried. On reprecipitation from warm dilute ammonia, 2.9 g. corresponding to 64% of the theoretical yield, are obtained. For analytical purposes the crude 2-ethyl thio-8,10-dioxo homopurine is three times reprecipitated and yields a very faintly yellow powder which does not have a melting point below 360° C. Mol weight: 224.2.

Calculated for $C_8H_8O_2N_4S$: 42.85% C; 3.59% H; 24.99% N. Found: 42.79% C; 3.57% H; 24.81% N.

EXAMPLE 18

2-allyl thio-8,10-dioxo homopurine prepared from 2-allyl thio-5-amino pyrimidine carboxylic acid-(4) and urea.

To produce said compound the procedure is followed as set forth in Example 17 whereby 2.1 g. (0.01 mol) of 2-allyl thio-5-amino pyrimidine carboxylic acid-(4) of the melting point 130–132° C. are used as starting material. Said pyrimidine carboxylic acid is obtained in an analogous manner as described for the corresponding 2-ethyl substituted carboxylic acid from the corresponding 2-allyl thio-5-bromo pyrimidine carboxylic acid-(4). The crude homopurine compound is purified by reprecipitation from warm dilute ammonia. The yield of the reprecipitated compound is 1.2 g. corresponding to 51% of the theoretical yield. For analytical purposes the crude product is reprecipitated three times yielding yellow microcrystalline prisms which melt at 305–308° C. with decomposition. Mol weight: 236.2.

Calculated for $C_9H_8O_2N_4S$: 45.75% C; 3.41% H; 23.72% N. Found: 45.89% C; 3.52% H; 22.41% N.

EXAMPLE 19

2-benzyl thio-8,10-dioxo homopurine prepared from 2-benzyl thio-5-amino pyrimidine carboxylic acid-(4) and urea.

To produce said compound the procedure is followed as set forth in Example 17 whereby 2.6 g. (0.01 mol) of 2-benzyl thio-5-amino pyrimidine carboxylic acid-(4) of the melting point 165–169° C. are used as starting material. Said pyrimidine carboxylic acid is obtained in an analogous manner as described for the corresponding 2-ethyl substituted carboxylic acid from the 2-benzyl thio-5-bromo carboxylic acid-(4). The crude homopurine compound is purified by reprecipitation from warm dilute ammonia. The yield of the reprecipitated crude compound is 1.6 g. corresponding to 56% of the theoretical yield. For analytical purposes the crude product is reprecipitated four times yielding a faintly yellowish amorphous powder which melts at about 300° C. with decomposition. Mol weight: 286.3.

Calculated for $C_{13}H_{10}O_2N_4S$: 54.53% C; 3.52% H; 19.57% N. Found: 54.37% C; 3.72% H; 19.10% N.

EXAMPLE 20

2-methyl thio-7-butyl-8,10-dioxo-homopurine prepared from 2-methyl thio-5-butylamino pyrimidine carboxylic acid-(4) and urea.

2.4 g. (0.01 mol) of 2-methyl thio-5-butylamino pyrimidine carboxylic acid-(4) of the melting point 117–119° C. are heated with 6 g. (0.1 mol) of urea to about 180° C. for 30 minutes. 30 cc. of water are added to the resulting reaction mixture. The precipitated crude homopurine compound is filtered off by suction after standing for some time and is reprecipitated from dilute ammonia. Yield: 1.0 g. corresponding to 38% of the theoretical yield. For analytical purposes the crude 2-methyl thio-7-butyl-8,10-dioxo homopurine is twice reprecipitated and the thus obtained yellowish microcrystalline small needles, which melt at 178–180° C., are dried at 130° C. and under a vacuum of 0.1 Torr. Mol weight: 266.3.

Calculated for $C_{11}H_{14}O_2N_4S$: 49.38% C; 5.27% H; 20.94% N. Found: 49.43% C; 4.87% H; 20.57% N.

EXAMPLE 21

2-methyl thio-9-methyl-8,10-dioxo homopurine prepared from 2-methyl thio-5-amino pyrimidine carboxylic acid-(4) and N,N′-dimethyl urea.

3.7 g. (0.02 mol) of 2-methyl thio-5-amino pyrimidine carboxylic acid-(4) are heated with 8.8 g. (0.1 mol) of crude N,N′-dimethyl urea to 170–180° C. for 30 minutes. The red-brown clear molten reaction mixture is cooled whereby crystals precipitate. 10 cc. of water are added thereto causing said crystals to dissolve. The resulting solution is allowed to stand for some time whereby the crude reaction product is completely precipitated. It is filtered off by suction, washed with water, and dried. 2.6 g. are obtained in this manner. The crude product contains 2-methyl thio-5-amino pyrimidine carboxylic acid amide-(4) which is formed as by-product. Said amide is difficultly soluble in dilute alkali hydroxide solutions and can be removed from the crude 2-methyl thio-9-methyl-8,10-dioxo homopurine by a treatment with dilute alkali hydroxide solution. The crude homopurine compound is purified for analytical purposes by dissolving it in cold very dilute alkali hydroxide solution, heating the solution, and precipitating the homopurine compound by the addition of dilute hydrochloric acid. This reprecipitation procedure is repeated four times and yields 0.4 g. of an almost colorless microcrystalline powder which melts at about 300° C. with decomposition and is dried at 170° C. under a vacuum of 0.1 Torr. The yield is 9% of the theoretical yield. Mol weight: 224.2.

Calculated for $C_8H_8O_2N_4S$: 42.84% C; 3.60% H; 24.99% N. Found 40.67% C; 3.70% H; 24.81% N.

EXAMPLE 22

2-methyl thio-9-methyl-10-oxo homopurine prepared from 2-methyl thio-5-amino pyrimidine carboxylic acid-(4) and N,N′-dimethyl formamidine.

5.6 g. (0.03 mol) of 2-methyl thio-5-amino pyrimidine carboxylic acid-(4) are heated with 0.1 mol of crude N,N'-dimethyl formamidine to about 120° C. within 15 minutes. Thereby endothermic reaction sets in and the temperature decreases. The reaction mixture is kept at about 120° C. for 15 more minutes. On cooling, the reaction product solidifies in crystalline form. It is digested with a small amount of acetone-ether (1:1) and is filtered off by suction. The yield is 4.5 g. corresponding to 72% of the theoretical yield. For analytical purposes the crude 2-methyl thio-9-methyl-10-oxo homopurine is recrystallized from water four times and the thus obtained almost colorless very small needles which melt at 159–162° C. are dried at 76° C. under a vacuum of 0.1 Torr. Mol weight: 208.2.

Calculated for $C_8H_8ON_4S$: 46.14% C; 3.87% H; 26.91% N. Found: 46.07% C; 3.78% H; 25.89% N.

EXAMPLE 23

2-methyl thio-10-oxo homopurine prepared from 2-methyl thio-5-amino pyrimidine carboxylic acid-(4) and formamide.

3.7 g. (0.02 mol) of 2-methyl thio-5-amino pyrimidine carboxylic acid-(4) are heated with 8 cc. of formamide (0.2 mol) and 1 cc. of formic acid to 180° C. for 30 minutes. The reaction mixture is cooled and 10 cc. of water are added thereto. Thereby crude 2-methyl thio-10-oxo homopurine precipitates which is filtered off by suction, washed, and dried. Yield: 2.6 g. corresponding to 67% of the theoretical yield. For analytical purposes the crude homopurine compound is recrystallized from water three times. Thereby wadding-like, felted, very fine, almost colorless, small needles are obtained which are dried at 130° C. under a vacuum of 0.1 Torr. Melting point: 284–285° C. with decomposition. Mol weight: 194.2.

Calculated for $C_7H_6ON_4S$: 43.29% C; 3.11% H. Found: 43.34% C; 3.28% H.

EXAMPLE 24

2-methyl thio-8-methyl-10-oxo homopurine prepared from 2-methyl thio-5-amino pyrimidine carboxylic acid-(4), acetamide, and acetic acid anhydride.

3.7 g. (0.02 mol) of 2-methyl thio-5-amino pyrimidine carboxylic acid-(4) are heated with 11.8 g. (0.2 mol) of acetamide and 10.3 cc. (0.1 mol) of acetic acid anhydride to 200° C. within about 30 minutes. The reaction mixture is then allowed to react at said temperature for 10 more minutes. Water is added thereto in a small amount and the resulting mixture is neutralized by the addition of 2 N ammonia solution. The neutralized mixture is allowed to stand for several days whereby crude 2-methyl thio-8-methyl-10-oxo homopurine precipitates in the form of dark crystals. For analytical purposes said crude product is four times reprecipitated from dilute ammonia and the thus obtained irregularly shaped, partly whetstone-shaped, orange crystals are dried at 130° C. under a vacuum of 0.1 Torr. Yield: 0.3 g. Melting point: 262–264° C. Mol weight: 208.2.

Calculated for $C_8H_8ON_4S$: 46.14% C; 3.87% H; 26.91% N. Found: 46.00% C; 3.95% H; 26.03% N.

EXAMPLE 25

2-methyl thio-8-thiono-10-oxo homopurine prepared from 2-methyl thio-5-amino pyrimidine carboxylic acid-(4) and ammonium thiocyanate.

3.7 g. (0.02 mol) of 2-methyl thio-5-amino pyrimidine carboxylic acid-(4) are heated with 15.2 g. of ammonium thiocyanate (0.2 mol) to 160–170° C. for 30 minutes. The resulting dark molten reaction mixture, while still warm, is digested with 60 cc. of water whereby crude 2-methyl thiono-8-thio-10-oxo homopurine precipitates in the form of a dark brown precipitate. Yield: 3.2 g. corresponding to 71% of the theoretical yield. For analytical purposes said crude product is four times reprecipitated from very dilute sodium hydroxide solution. Thereby fine, brightly yellow small needles which melt at about 300° C. with decomposition are obtained. Mol weight: 226.3.

Calculated for $C_7H_6ON_4S$: 37.15% C; 2.67% H; 24.76% N. Found: 37.31% C; 2.69% H; 25.71% N.

EXAMPLE 26

2-methyl thio-10-oxo homopurine-9-carboxylic acid amide prepared from 5-amino uracil carboxylic acid-(4) and mono-formyl urea.

3.7 g. (0.02 mol) of 2-methyl thio-5-amino pyrimidine carboxylic acid-(4) are heated with 8.8 g. (0.1 mol) of mono-formyl urea to 170–180° C. within about 5 minutes. The reaction mixture is kept at said temperature for 15 more minutes. 20 cc. of water are added thereto causing the crude reaction product to precipitate in the form of a brown amorphous precipitate. It is filtered off by suction, washed, and dried. Yield: 3.7 g. corresponding to 78% of the theoretical yield. Said crude compound is purified by three times repeated reprecipitation from warm dilute ammonia solution. Thereby almost colorless, very fine, small needles of the melting point 278–282° C. are obtained. The compound tends to split off ammonia.

The new homopurine compounds according to the present invention are valuable therapeutic compounds and, in general, exhibit therapeutic activity similar to the therapeutic activity of the corresponding purine compounds.

Many compounds of this group possess remarkable diuresis-increasing activity and are excellent coronary vasodilators and myocardial stimulants.

Compounds of this series which contain sulfur in their molecule are of pronounced thyrostatic activity, i. e. they stimulate the action of the thyroid gland.

For instance, 2-methyl-8,10-dioxo homopurine as it is obtained according to Examples 1 to 3 has a high diuretic effect somewhat like that of caffeine.

2-benzyl-8,10-dioxo 7,9-dimethyl homopurine as obtained according to Example 5 and subsequent methylation is an excellent coronary vasodilator.

The compound obtained according to Example 13 has also provided to be a valuable coronary vasodilator with the advantage that it does not exert any stimulating effect upon the central nervous system and has only a very slight effect upon blood pressure.

Compounds which are substituted by allyl and benzyl radicals, as they are obtainable according to the process of the present invention, act as highly effective coronary vasodilators and are similar in their activity to papaverine.

This new group of compounds has excellent therapeutic properties and, therefore, represent a marked contribution to the number of drugs available to the medical profession.

Various modifications and changes in the starting materials used, the reaction conditions, temperature, and duration, the methods of isolating and purifying the reaction products, and the like, may be made by those skilled in the art in accordance with the principles set forth herein and without departing from the scope of the claims annexed hereto.

We claim:

1. Homopurine derivatives having a structural formula selected from the group consisting of

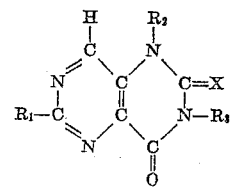

and

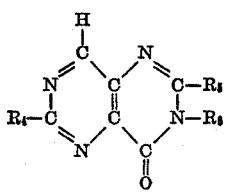

wherein $R_1$ is selected from the group consisting of lower alkyl, lower alkyl-thio, benzyl, benzyl-thio, lower alklene-thio and phenyl, $R_2$ is selected from the group consisting of hydrogen and lower alkyl, $R_3$ is selected from the group consisting of hydrogen and lower alkyl, $R_4$ is selected from the group consisting of lower alkyl, phenyl and lower alkyl-thio, $R_5$ is selected from the group consisting of hydrogen and lower alkyl, $R_6$ is selected from the group consisting of hydrogen, phenyl, lower alkyl and —$CONH_2$, and X is selected from the group consisting of oxygen and sulfur.

2. 8,7,9-trimethyl-8,10-dioxo homopurine.
3. 2-benzyl-8,10-dioxo homopurine.
4. 2-allyl thio-8,10-dioxo homopurine.
5. 2-methyl-8,10-dioxo homopurine.
6. 2-methylthio-10-oxo homopurine.
7. The process of producing homopurine derivatives having a structural formula selected from the group consisting of and wherein $R_1$ is selected from the group consisting of lower alkyl, phenyl, benzyl, lower alkyl-thio, benzyl-thio, and lower alklene-thio, $R_2$ is selected from the group consisting of hydrogen and lower alkyl, $R_3$ is selected from the group consisting of hydrogen and lower alkyl, $R_4$ is selected from the group consisting of lower alkyl, phenyl, and lower alkyl-thio, $R_5$ is selected from the group consisting of hydrogen and lower alkyl, $R_6$ is selected from the group consisting of hydrogen, phenyl, lower alkyl and —$CONH_2$, and X is selected from the group consisting of oxygen and sulfur, which comprises subjecting a compound having the structural formula wherein $R_1$ has the same meaning as above indicated, $R_7$ is selected from the group consisting of halogen, amino and mono-lower alkyl-amino, and $R_8$ is selected from the group consisting of —COOH and —$CONH_2$, to a condensation reaction at a temperature between substantially room temperature and about 250° C. with a compound selected from the group consisting of compounds having the structural formula wherein R is selected from the group consisting of hydrogen, amino, lower alkyl-amino, lower alkyl, and acyl-amino, Y is selected from the group consisting of lower alkyl, amino, lower alkyl-amino and phenyl-amino, and X is selected from the group consisting of oxygen, sulfur, phenyl-imino and lower alkyl-imino, and compounds having the structural formula wherein Z is selected from the group consisting of —OH, —ONa, halogen and —$SNH_4$, in the presence of a basic compound selected from the group consisting of ammonia, ammonium chloride, ammonium carbonate, ammonium bicarbonate, urea and aniline, and separating the homopurine derivative formed thereby from the reaction mass.

8. The process according to claim 7, wherein the condensation reaction is carried out in the presence of an inert diluent.
9. The process according to claim 8, wherein the inert diluent is selected from the group consisting of water, monohydroxy - alcohols, polyhydroxy-alcohols, acid amides, aliphatic tertiary amines, and aromatic tertiary amines.
10. The process according to claim 7, wherein the condensation reaction is carried out in the presence of a condensation accelerator selected from the group consisting of copper sulfate and powdered metallic copper.
11. The process according to claim 7, wherein the condensation reaction is carried out in the presence of a dehydrating agent selected from the group consisting of acetic acid anhydride, hydrochloric acid and alkali metal hydroxides.
12. The process according to claim 7, wherein the condensation reaction is carried out at elevated pressure.

References Cited in the file of this patent
FOREIGN PATENTS
845,940   Germany _____ July 8, 1949
OTHER REFERENCES
Fischer et al.: Annalen 572, 217–240 (1951).

UNITED STATES PATENT OFFICE
CERTIFICATE OF CORRECTION

Patent No. 2,826,580                                      March 11, 1958

Gottwalt Franz Fischer et al.

It is hereby certified that error appears in the above numbered patent requiring correction and that the said Letters Patent should read as corrected below.

In the heading to the printed specification, line 10, date of priority, for "January 15, 1944" read --January 15, 1954--; column 11, line 73, for "thiono-8-thio-10-oxo" read --thio-8-thiono-10-oxo--; column 13, lines 14 and 56, for "alklene", each occurrence, read --alkene--; same column 13, line 24, for "8,7,9-trimethyl-" read -- 2,7,9-trimethyl- --.

Signed and sealed this 20th day of May 1958.

(SEAL)
Attest:
KARL H. AXLINE

Attesting Officer

ROBERT C. WATSON
Commissioner of Patents